(12) United States Patent
Brugger

(10) Patent No.: US 8,978,366 B2
(45) Date of Patent: Mar. 17, 2015

(54) COMPACT EXHAUST GAS TREATMENT UNIT WITH REACTION AGENT ADDITION AND MOTOR VEHICLE HAVING AN EXHAUST GAS TREATMENT UNIT

(71) Applicant: EMITEC Gesellschaft für Emissionstechnologie mbH, Lohmar (DE)

(72) Inventor: Marc Brugger, Neunkirchen-Seelscheid (DE)

(73) Assignee: EMITEC Gesellschaft fuer Emissionstechnologie mbH, Lohmer (DE)

( * ) Notice: Subject to any disclaimer, the term of this patent is extended or adjusted under 35 U.S.C. 154(b) by 45 days.

(21) Appl. No.: 13/770,072

(22) Filed: Feb. 19, 2013

(65) Prior Publication Data
US 2013/0152557 A1 Jun. 20, 2013

Related U.S. Application Data

(63) Continuation of application No. PCT/EP2011/064048, filed on Aug. 15, 2011.

(30) Foreign Application Priority Data

Aug. 18, 2010 (DE) .......................... 10 2010 034 705

(51) Int. Cl.
*F01N 3/00* (2006.01)
*B01D 53/94* (2006.01)
(Continued)

(52) U.S. Cl.
CPC ................. *B01D 53/94* (2013.01); *F01N 3/035* (2013.01); *F01N 3/106* (2013.01); *F01N 3/108* (2013.01);
(Continued)

(58) Field of Classification Search
CPC ....... F01N 3/035; F01N 3/108; F01N 3/2066; F01N 3/2889; F01N 3/106; F01N 13/02; F01N 2240/02; F01N 2240/20; F01N 2470/18; F01N 2470/22; F01N 2470/24; F01N 2610/02; F01N 2610/1453; B01D 53/94; Y02T 10/24
USPC .................................................... 60/272–324
See application file for complete search history.

(56) References Cited

U.S. PATENT DOCUMENTS 6,312,650 B1 * 11/2001 Frederiksen et al. ......... 422/180
6,620,391 B2 * 9/2003 Muller et al. ................. 423/210
(Continued)

FOREIGN PATENT DOCUMENTS

| DE | 10202005 A1 | 8/2002 |
|----|-------------|--------|
| DE | 60016218 T2 | 2/2006 |

(Continued)

OTHER PUBLICATIONS

International Search Report of PCT/EP2011/064048.

*Primary Examiner* — Jesse Bogue
(74) *Attorney, Agent, or Firm* — Laurence A. Greenberg; Werner H. Stemer; Ralph E. Locher

(57) ABSTRACT

An exhaust gas treatment unit at least includes an approach flow region, a diverting region, a backflow region and an outflow region disposed consecutively in terms of flow. The backflow region and the outflow region are disposed on an outer surface of the approach flow region and an addition unit for a reaction agent is disposed in the outflow region. A motor vehicle having an exhaust gas treatment unit is also provided.

10 Claims, 2 Drawing Sheets

(51) Int. Cl.
  *F01N 3/035* (2006.01)
  *F01N 3/10* (2006.01)
  *F01N 3/20* (2006.01)
  *F01N 3/28* (2006.01)
  *F01N 13/00* (2010.01)

(52) U.S. Cl.
  CPC ............ *F01N 3/2066* (2013.01); *F01N 3/2889* (2013.01); *F01N 2240/02* (2013.01); *F01N 2240/20* (2013.01); *F01N 2470/18* (2013.01); *F01N 2470/22* (2013.01); *F01N 2470/24* (2013.01); *F01N 2610/02* (2013.01); *F01N 2610/1453* (2013.01); *Y02T 10/24* (2013.01); *F01N 13/009* (2013.01)
  USPC ................................. 60/295; 60/296; 60/301

(56) References Cited

U.S. PATENT DOCUMENTS

| | | | |
|---|---|---|---|
| 6,680,037 B1 | 1/2004 | Allansson et al. | |
| 6,722,124 B2 * | 4/2004 | Pawson et al. | 60/286 |
| 6,837,336 B2 * | 1/2005 | Gault et al. | 181/258 |
| 7,351,381 B2 * | 4/2008 | Ball et al. | 422/170 |
| 7,448,206 B2 | 11/2008 | Meingast et al. | |
| 7,866,143 B2 | 1/2011 | Buhmann et al. | |
| 7,877,983 B2 * | 2/2011 | Kunkel et al. | 60/286 |
| 8,015,802 B2 | 9/2011 | Nishiyama et al. | |
| 2004/0040782 A1 * | 3/2004 | Frederiksen | 181/258 |
| 2006/0107656 A1 | 5/2006 | Bruck | |
| 2009/0107120 A1 | 4/2009 | Bruck et al. | |
| 2010/0263352 A1 * | 10/2010 | Hylands et al. | 60/273 |

FOREIGN PATENT DOCUMENTS

| | | | | |
|---|---|---|---|---|
| DE | 60018794 T2 | 3/2006 | | |
| DE | 102005002289 A1 | 7/2006 | | |
| GB | 2381218 A * | 4/2003 | | F01N 3/28 |
| GB | 2 434 557 A | 8/2007 | | |
| WO | 97/43528 A1 | 11/1997 | | |
| WO | 2005/001252 A1 | 5/2006 | | |

* cited by examiner

COMPACT EXHAUST GAS TREATMENT UNIT WITH REACTION AGENT ADDITION AND MOTOR VEHICLE HAVING AN EXHAUST GAS TREATMENT UNIT

CROSS-REFERENCE TO RELATED APPLICATION

This is a continuation, under 35 U.S.C. §120, of International Application No. PCT/EP2011/064048, filed Aug. 15, 2011, which designated the United States; this application also claims the priority, under 35 U.S.C. §119, of German Patent Application DE 10 2010 034 705.1, filed Aug. 18, 2010; the prior applications are herewith incorporated by reference in their entirety.

BACKGROUND OF THE INVENTION

Field of the Invention

The invention relates to a compact exhaust gas treatment unit in which the exhaust gas is diverted several times. The exhaust gas is furthermore treated in the exhaust gas treatment unit by an additive or reaction agent and, if appropriate, by at least one catalytic converter or filter, etc. as well.

Due to the continuous increase in automobile traffic and stricter exhaust standards, it is important for motor vehicles having an internal combustion engine that the exhaust gases from the internal combustion engine should be purified efficiently. For that purpose, the prior art discloses exhaust gas purification systems in which the exhaust gas from the internal combustion engine is passed across a catalytically active surface and pollutants in the exhaust gas, such as nitrogen oxide compounds, soot particles, carbon monoxide, hydrocarbons, etc. are converted into substances such as nitrogen, water and $CO_2$ with the aid of a catalyst material deposited on the surface. As a rule, relatively high exhaust gas temperatures are required for efficient conversion of exhaust gases. The temperature of the exhaust gases from an internal combustion engine is generally highest directly after the exhaust gases have left the internal combustion engine, and therefore the vicinity of the internal combustion engine (e.g. in the engine compartment of a motor vehicle) is a favorable location to place an exhaust gas purification system in that case. However, installation space in the vicinity of the engine is generally very limited in motor vehicles.

In order to nevertheless be able to use the limited installation space in the engine compartment for exhaust gas purification systems, in particular compact exhaust gas treatment units with concentric flow have been developed which are known, for example, from International Publication No. WO 2005/001252, corresponding to U.S. Patent Application Publication No. 2006/0107656. In such an exhaust system, the exhaust gas initially flows through an approach flow or inflow region, is then diverted and flows back through an outer backflow region. In that case, the backflow region is disposed concentrically around the approach flow region, ensuring efficient heat transfer between the approach flow region and the backflow region. In general, some of the catalytic reactions taking place at the catalyst surfaces of an exhaust system are exothermic, and therefore the exhaust gases flowing back are generally subject to additional heating. Due to the efficient heat transfer between the approach flow and the backflow, the exhaust gas temperature in the exhaust system can thus be increased or maintained at a high level, ensuring particularly efficient conversion. At the same time, the division of the exhaust system into an approach flow region, a diverting region and a backflow region ensures a particularly compact configuration of the exhaust system, thus enabling the system to be disposed in the engine compartment or in the vicinity of the internal combustion engine of a motor vehicle.

In exhaust gas purification systems of that kind, there is provision in some cases for adding a reaction agent to the exhaust gas. That reaction agent includes a reducing agent or a reducing agent precursor (in particular an aqueous urea solution) for example, which contributes to the conversion of pollutants in the exhaust gas into harmless components in interaction with coatings specially provided for that purpose. In that case, such additional units for those reaction agents are disposed in such a way that, as far as possible, optimum distribution in the exhaust gas and a high degree of evaporation of the reaction medium supplied are achieved. In that case, the reaction agent is applied to honeycomb bodies in the flow direction or counter to the flow direction of the exhaust gas, e.g. directly to the honeycomb bodies, with the result that evaporation is promoted by the impingement of the reaction agent on the (hot) honeycomb body, and fine division of the reaction agent droplets and, if appropriate, storage of the reaction agent in the structure or in the coating of the honeycomb body are achieved. However, that application of the reaction agent to a honeycomb body can also lead to the coating of the honeycomb body being damaged, e.g. by water hammer or by the temperature difference between the honeycomb body and the reaction agent.

SUMMARY OF THE INVENTION

It is accordingly an object of the invention to provide a compact exhaust gas treatment unit with reaction agent addition and a motor vehicle having an exhaust gas treatment unit, which overcome the hereinafore-mentioned disadvantages and at least partially solve the highlighted technical problems of the heretofore-known units and vehicles of this general type. In particular, the intention is to specify an exhaust gas treatment unit which, on one hand, provides a compact construction and, on the other hand, allows particularly suitable addition of liquid reaction agent involving evaporation that reduces stress on components of the exhaust gas treatment unit.

With the foregoing and other objects in view there is provided, in accordance with the invention, an exhaust gas treatment unit, comprising, disposed in series or consecutively in terms of flow, at least one approach flow region, one diverting region, one backflow region and one outflow region. In this configuration, the backflow region and the outflow region are disposed on an outer surface of the approach flow region. Moreover, an addition unit for a reaction agent is disposed in the outflow region.

Starting from the internal combustion engine, the exhaust gas flows through an exhaust line toward the exhaust gas treatment unit and enters the latter through an approach flow region. After flowing through the approach flow region, the exhaust gas is diverted in a first diverting region in such a way that it flows, in particular (concentrically), around the outside of the approach flow region through the backflow region to an outflow region. In this configuration, the backflow region and the outflow region are, in particular, disposed on the outer surface of the approach flow region. After flowing through the backflow region, the exhaust gas flowing (concentrically) around the outside of the approach flow region is brought together in the outflow region and leaves the exhaust gas treatment unit, in particular through a single exhaust line. In this configuration, the addition unit for adding a reaction agent (in particular an aqueous urea solution) is disposed in the outflow region. Thus, the reaction agent is preferably added in the final flow section of the exhaust gas treatment unit. Precisely at this point, a small flow cross section and/or a winding flow path is often provided, a flow section which consequently produces an at least partially turbulent flow and is thus conducive to the addition of reaction agent. In this region of the exhaust gas treatment unit, there are usually no honeycomb bodies upon which the reaction agent could correspondingly impinge. The reaction agent is added to the exhaust gas by the addition unit in the outflow region, where it mixes with the exhaust gas and at least partially evaporates due to the heat of the exhaust gas. It is only after leaving the exhaust gas treatment unit and after very extensive evaporation or fine division of the reaction agent that the exhaust gas impinges again upon exhaust gas cleaning components that may be disposed in the exhaust line, including honeycomb bodies. In this case, however, the reaction agent is already so finely divided in the exhaust gas flow that damage, e.g. to coatings but also to structures of the honeycomb bodies disposed in the exhaust gas flow, is avoided.

In accordance with another advantageous feature of the exhaust gas treatment device of the invention, the addition unit is disposed in such a way that the reaction agent can be fed at least partially onto the outer surface of the approach flow region. For this purpose, the addition unit is, in particular, disposed radially to the outside of the approach flow region and aligned toward the approach flow region. By virtue of such a particularly advantageous configuration of the addition unit, the reaction agent impinges at least partially upon the outer surface of the approach flow region, which has quite a high temperature, even at an early stage, due to its proximity to the internal combustion engine, and/or is connected by heat conduction to an adjacent catalytically active catalytic converter. Through its impingement on the outer surface, the reaction agent, which emerges from the addition unit, in particular at least partially in droplet form, is more finely atomized in terms of its droplet size and is accordingly distributed better in the exhaust gas flow. The consequent increase in the surface area of the reaction agent promotes the evaporation of the reaction agent in the exhaust gas flow. Since the outer surface of the approach flow region is formed by a (robust) tube or by a jacket, for example, damage to this outer surface of the kind which might otherwise occur in the case of honeycomb body structures, for example, is avoided.

In accordance with a further advantageous feature of the exhaust gas treatment device of the invention, devices for improving heat transfer are provided in the region of the approach flow region, thus ensuring that the wall temperature of the outer surface of the approach flow region, particularly in the region in which the reaction agent impinges upon the outer surface, reaches a high temperature particularly quickly. Such devices can be heat conducting plates or heat exchanger plates in the region of the approach flow region for example, which plates can accelerate heating of the wall of the approach flow region in the region of the outer surface through the use of the exhaust gas. Moreover, the outer surface can be embodied in such a way that it can be heated at least in part, in particular electrically. In particular, heating is carried out in the region of the outer surface which is acted upon by the reaction agent. In addition, measures can be taken to reduce heat transfer from the outer surface of the approach flow region. In this way, it is possible to ensure that the temperature of the wall in the region of the outer surface, once reached, can be maintained for as long as possible. In particular, the outflow region is embodied with insulation relative to the outside, thus ensuring that the heat of the exhaust gas and also the heat that is already stored in the outer surface is not dissipated unhindered.

In accordance with an added advantageous feature of the exhaust gas treatment device of the invention, the approach flow region has at least one heat transfer element for transferring heat in the exhaust gas to the outer surface. A "heat transfer element" of this kind promotes heat transfer from the exhaust gas to the outer surface of the approach flow region, in particular. Thus, for example, swirl elements, guide vanes and/or ribs can be provided, interacting with the approaching exhaust gas in such a way that an improvement in heat transfer is achieved. In this way, the temperature of the outer surface can be increased and/or held at a high level in a particularly effective manner (for evaporation of the reducing agent on the rear side).

In accordance with an additional advantageous feature of the exhaust gas treatment device of the invention, the backflow region has at least one flow deflector for deflecting or calming the exhaust gas. A flow deflector of this kind has the effect that the exhaust gas does not flow through that region, in particular, in which a hot surface area is required on the outer surface for evaporation of the reducing agent, or does so only with reduced intensity. In order to achieve this, suitably positioned flow deflectors can be provided, for example, establishing at that location a kind of lee zone or flow shadow and/or slow flow boundary layer. However, it is also possible for the flow deflector (merely) to laminarize the exhaust gas and thus reduce intensity of contact between the exhaust gas and the outer surface. The result is that the exhaust gas flowing back takes away less heat from the wall temperature and therefore that there is more heat available for evaporation/conversion of the reducing agent.

In accordance with yet another advantageous feature of the exhaust gas treatment device of the invention, at least the backflow region has a flow cross section which changes transversely to a flow direction of an exhaust gas. As a rule, known compact exhaust gas treatment units have concentrically disposed approach flow and backflow regions. Due to the application of the reaction agent in a diverting region, the reaction agent normally acts on the entire exhaust gas flow. In the exhaust gas treatment unit presented herein, the configuration of the addition unit in the outflow region makes it possible, in particular, for only a part of the exhaust gas flow to absorb the reaction agent after it emerges from the addition unit. In particular, the backflow region can have a flow cross section which changes (narrows/widens) transversely to a flow direction (that is to say, in particular, in a circumferential direction around the approach flow region) of an exhaust gas if the approach flow region is disposed eccentrically with respect to the backflow region. Thus, the cross section of the backflow region decreases in one region, while that cross section increases in one region. As a result, the quantity of exhaust gas can be divided up accordingly, which is required for optimum evaporation of the reaction agent. Moreover, by only mixing with the remainder of the exhaust gas at a later time it is possible to achieve optimum mixing of the reaction agent in the exhaust gas flow. Introducing the reaction agent into a partial flow of the exhaust gas consequently ensures at least two-stage mixing of the reaction agent in the exhaust gas: first, the reaction agent is added to the first partial exhaust gas flow, and then fine division of the reaction agent is achieved at this early stage by impingement on the outer surface of the approach flow region. By virtue of the configuration of the addition unit in a region of the outflow region through which only part of the flow of the exhaust gas flows, there is additional mixing of the reaction agent through the mixing of the partial flow of exhaust gas already containing reaction agent with the remainder of the exhaust gas flow flowing out of the backflow region and into that part of the outflow region which has not been supplied with reaction agent by the addition unit.

In accordance with yet a further advantageous feature of the exhaust gas treatment device of the invention, the outer surface of the approach flow region has at least one at least partial coating or a structure, which increases the surface area of the outer surface. Of course, it is also possible for both measures to be provided together. The structure and/or coating thus serves to maximize the evaporation surface, for example. Moreover, it is also possible for at least that part of the outer surface of the approach flow region upon which the reaction agent acts to be provided at least partially with at least one coating, ensuring that there is at least partial conversion of the reaction agent. In particular, the coating can have a hydrolysis function in this case, thus ensuring that a reaction agent containing a reducing agent precursor (in particular aqueous urea solution) is converted appropriately to a reducing agent (in this case ammonia). As a result, it may be possible to dispense with an additional honeycomb body with a hydrolysis catalyst coating. Particularly in the case of a diesel engine, this hydrolysis catalytic converter is disposed ahead of an SCR catalytic converter in order to generate ammonia from a liquid reducing agent precursor containing urea, which allows conversion of the NO contained in the exhaust gas into $NO_2$ in the SCR catalytic converter. In addition, this coating of the outer surface makes it possible to reduce the volume of catalytic converters disposed downstream, e.g. a hydrolysis catalytic converter with a titanium oxide coating. Since the application of the coating to the outer surface of the approach flow region can be made very simple, there is a large potential for cost savings in this case compared with the honeycomb structures which would otherwise be necessary. Moreover, the coating can have a storage function for the reaction agent, with the reaction agent thus being released from the storage layer again, in accordance with the exhaust gas temperature and/or in accordance with the mass flow of the exhaust gas for example, and taken along in the exhaust gas.

In particular, the structure which enlarges the outer surface can be embodied as a coating (e.g. as a washcoat) and/or with ribs, knobs, corrugations and the like. The structure increases the available surface area to which the reaction agent is applied and thus promotes heat transfer from the hot outer wall to the reaction agent. The structure which enlarges the outer surface can also be formed by a porous material (nonwoven, woven fabric, foam) which is applied to the outer wall and can additionally be coated if appropriate.

In accordance with yet an added advantageous feature of the exhaust gas treatment device of the invention, an oxidation catalytic converter is disposed within the approach flow region, and an exhaust gas is diverted in the first diverting region in such a way that it passes through the backflow region, which surrounds the approach flow region in a region in which the oxidation catalytic converter is disposed, into the outflow region. The approach flow region has an inflow region disposed upstream, which extends in the form of a tube through the outflow region and to the outer surface of which a reducing agent or a reducing agent precursor is applied by the addition unit.

In particular, the oxidation catalytic converter is suitable for exothermic conversion of hydrocarbons. Moreover, additional and/or multi-part honeycomb bodies or catalytic converters can be disposed in the outer backflow region, even if it is preferred that this backflow region should not be embodied concentrically and should be free of internal fittings. In this case, the backflow region is constructed in such a way that it surrounds the region of the approach flow region in which the oxidation catalytic converter is disposed. This means that the outflow region does not surround any part of the approach flow region in which the oxidation catalytic converter is disposed. Such a configuration avoids a situation where the oxidation catalytic converter disposed in the approach flow region is damaged by application of the reaction agent to the approach flow region, due to the cooling of the tube or jacket of the approach flow region which may occur.

The approach flow region now has an inflow region which is disposed upstream of the oxidation catalytic converter and which extends in the form of a tube through the outflow region and is therefore disposed at least partially within the outflow region. The exhaust gas flows into the exhaust gas treatment unit through this inflow region. By virtue of the functional separation between the inflow region (provided free from internal fittings) and the approach flow region (which has a honeycomb body or catalytic converter), the inflow region can be constructed specifically for the requirements with regard to incorporation into the housing of the exhaust gas treatment unit and with regard to the application of the reaction agent to its surface.

With the objects of the invention in view, there is concomitantly provided a motor vehicle, comprising an internal combustion engine, an exhaust line and a device for supplying a reaction agent. The exhaust line has at least one exhaust gas treatment unit according to the invention. Diesel or, alternatively, spark-ignition internal combustion engines, in particular, are provided in this case as the internal combustion engine. The device for supplying a reaction agent includes, in particular, a reaction agent reservoir and a delivery device for delivering the reaction agent from the reservoir to the addition unit and also a corresponding controller for appropriate metering of the reaction agent.

Other features which are considered as characteristic for the invention are set forth in the appended claims, noting that the features presented individually in the claims can be combined in any technologically meaningful way and can give rise to additional embodiments of the invention.

Although the invention is illustrated and described herein as embodied in a compact exhaust gas treatment unit with reaction agent addition and a motor vehicle having an exhaust gas treatment unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
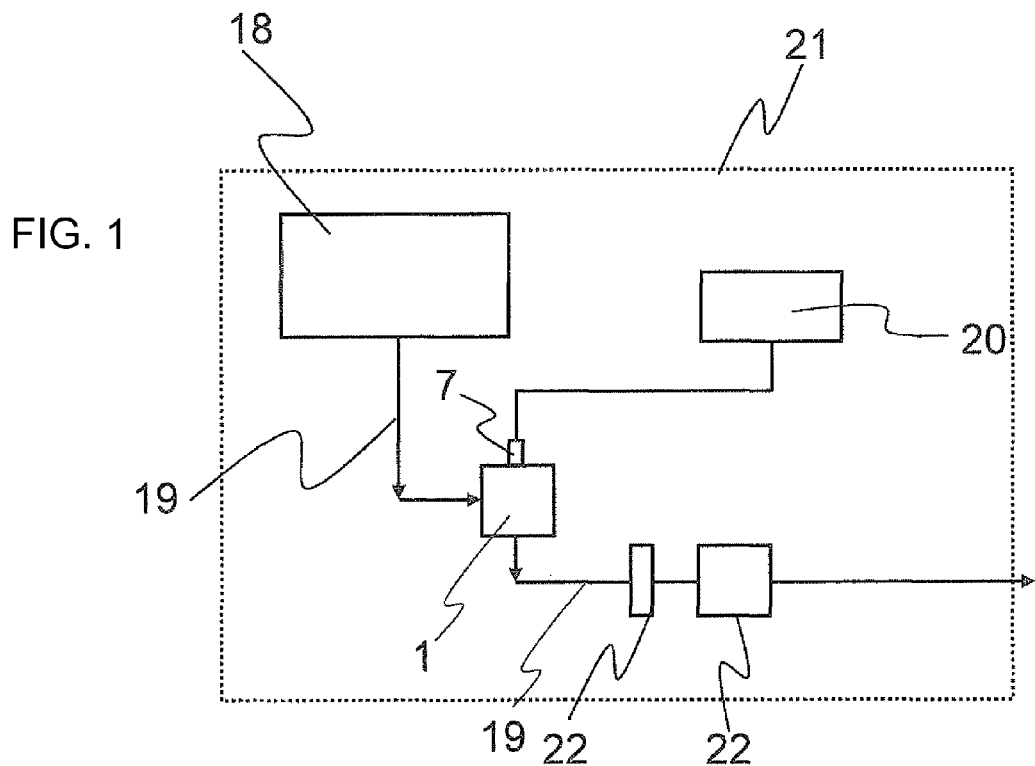
FIG. 1 is a block diagram of a motor vehicle having an exhaust line.

Referring now to the figures of the drawings in detail and first, particularly, to FIG. 1 thereof, there is seen a schematic illustration of a configuration of an exhaust gas treatment unit 1 within a motor vehicle 21. The motor vehicle 21 has an internal combustion engine 18, which discharges an exhaust gas to the environment through an exhaust line 19. The exhaust gas treatment unit 1, which is provided within the exhaust line 19, has an addition unit 7. The addition unit 7 is connected to a device 20 which feeds a reaction agent to the exhaust gas treatment unit 1, in a controlled manner if appropriate. Further elements 22 (selected as at least one of the following group: catalytic converters, filters, particle separators, turbochargers, adsorbers, etc.), which assist exhaust gas purification, are disposed within the exhaust line 19, downstream of the exhaust gas treatment unit 1.

Figure 2:
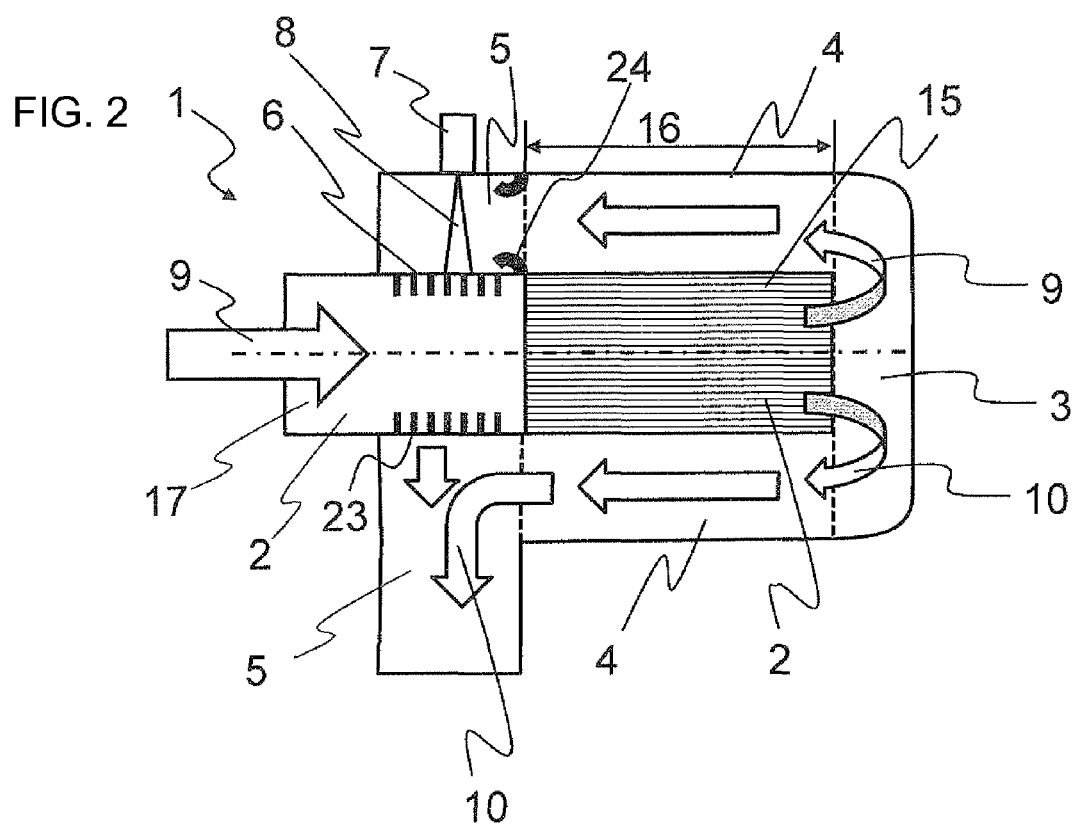
FIG. 2 is a diagrammatic, longitudinal-sectional view of a first embodiment of an exhaust gas treatment unit.

FIG. 2 diagrammatically shows a first embodiment of the exhaust gas treatment unit 1. In this case, an exhaust gas 10 enters the exhaust gas treatment unit 1 in a flow direction 9 through an approach flow or inflow region 2. The approach flow region 2 has an outer surface 6 (e.g. an outer surface which is cylindrical, conical, etc., at least in sections) and a plurality of heat transfer elements 23 for transferring heat in the exhaust gas to the outer surface 6. Moreover, an oxidation catalytic converter 15 is disposed within the approach flow region 2. The exhaust gas 10 flows through the approach flow region 2 and then through the oxidation catalytic converter 15, and is diverted in a first diverting region 3 in such a way that the exhaust gas 10 is then carried concentrically on the outside past the approach flow region 2, through a backflow region 4, in the direction of an outflow region 5. In this case, a plurality of flow deflectors 24 for deflecting or calming the exhaust gas are provided in the backflow region 4, with the result that the exhaust gas only reaches the region in which the reducing agent impinges upon the hot outer surface 6 with reduced intensity.

The approach flow region 2 has a region 16 in which the oxidation catalytic converter 15 is disposed. After leaving the backflow region 4, the exhaust gas 10 flows into the outflow region 5. Some of the exhaust gas 10 flows over the outer surface 6 of the approach flow region 2, to which a reaction agent 8 is applied, at least in a partial region. The reaction agent 8 is introduced into the outflow region 5 through an addition unit 7. In this case, the addition unit 7 is disposed on that side of the approach flow region 2 which lies opposite an outlet for the exhaust gas, a detail which may be particularly important in ensuring that direct emergence of the reaction agent 8 through the outlet can be avoided. The exhaust gas 10 combines within the outflow region 5 and flows out of the exhaust gas treatment unit 1.

Figure 3:
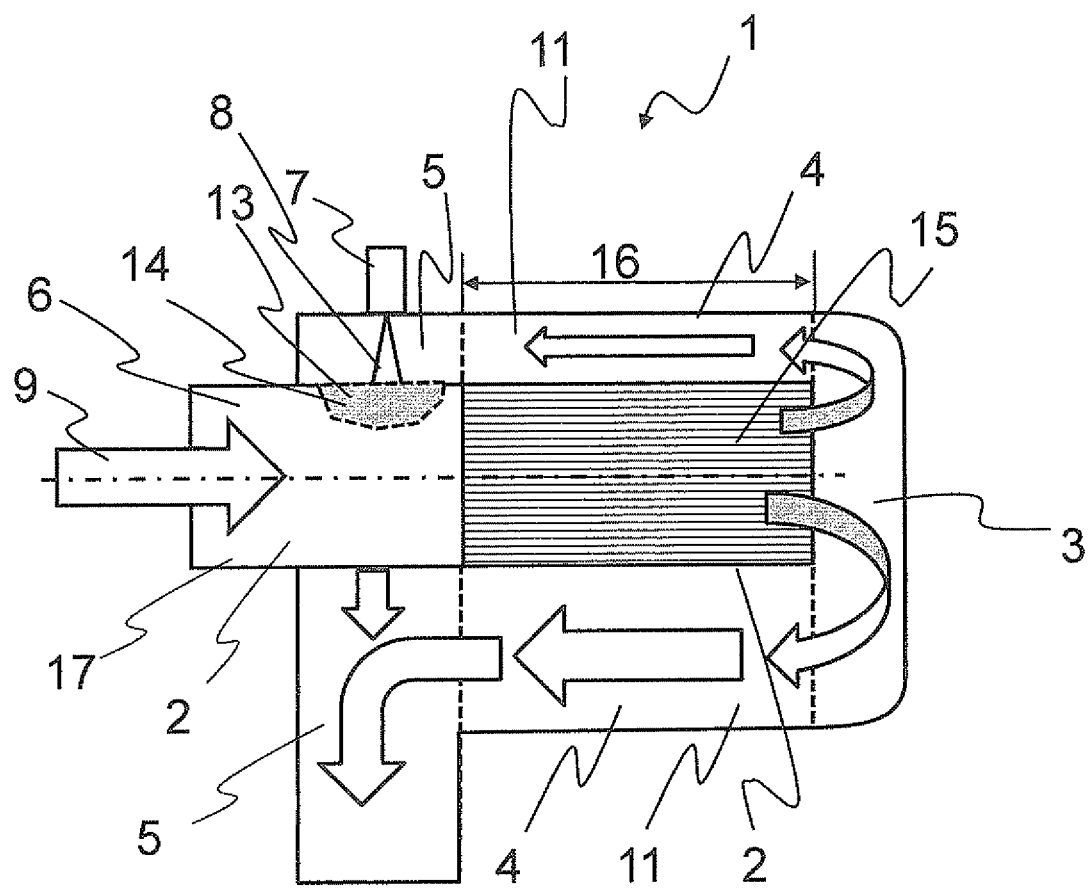
FIG. 3 is a longitudinal-sectional view of a second embodiment of an exhaust gas treatment unit.

FIG. 3 diagrammatically shows a second embodiment of the exhaust gas treatment unit 1 and, in this case too, the exhaust gas 10 penetrates into the approach flow region 2 in a flow direction 9. An inflow region 17 disposed within the approach flow region 2 adjoins the region 16. The oxidation catalytic converter 15 is disposed in the region 16. The exhaust gas 10 is diverted in the diverting region 3 in such a way that it flows through the backflow region 4 concentrically around the approach flow region 2. In the illustration shown therein, the approach flow region 2 is not disposed centrally within the exhaust gas treatment unit 1, making a flow cross section 11 smaller in the upper part of the exhaust gas treatment unit 1 and forming a reduced backflow region 4. The backflow region 4 has a larger flow cross section 11 in the lower part of the exhaust gas treatment unit 1. The addition unit 7 is disposed in the outflow region 5 of the exhaust gas treatment unit 1 and supplies the reaction agent 8 at least in part to the outer surface 6 of the inflow region 17. In this case, the addition unit 7 is once again disposed on the opposite side of the approach flow region 2 from the outlet for the exhaust gas in order to avoid the reaction agent 8 emerging directly through the outlet. A structure 13, which increases the surface area 14 upon which the reaction agent 8 impinges, is formed on the outer surface 6, thus improving evaporation of the reaction agent 8.

The present invention with all its variants solves the problems explained with reference to the prior art. In particular, damage to a honeycomb body or to the coating thereof is avoided since the reaction agent is not applied directly to the honeycomb body or to the coating. The evaporation of the reaction agent is achieved, in particular, through multi-stage mixing of the exhaust gas with the reaction agent and by providing a robust surface. Moreover, it is possible in this way to use particularly hot regions of the exhaust line to evaporate the reaction agent. The addition unit can be disposed within the outflow region in such a way that addition counter to the flow direction of the exhaust gas is also possible and corresponding distribution of the reaction agent within the exhaust gas is improved.

The invention claimed is:

1. An exhaust gas treatment unit, comprising:
   an approach flow region, a diverting region, a backflow region and an outflow region disposed in series in terms of flow;
   said approach flow region having an outer surface on which said backflow region and said outflow region are disposed; and
   an addition unit disposed in said outflow region and configured to add a reaction agent, said addition unit being disposed to feed the reaction agent at least partially onto said outer surface of said approach flow region, said addition unit being disposed radially to an outside of said approach flow region and aligned toward said approach flow region.

2. The exhaust gas treatment unit according to claim 1, wherein said outer surface is configured to be heated at least in part.

3. The exhaust gas treatment unit according to claim 1, which further comprises an exhaust gas flow direction, at least said backflow region having a flow cross section changing transversely to said exhaust gas flow direction.

4. The exhaust gas treatment unit according to claim 1, wherein said outer surface of said approach flow region has a surface area and at least one at least partial coating or a structure configured to increase said surface area of said outer surface relative to a surface without said at least one partial coating or structure.

5. The exhaust gas treatment unit according to claim 1, wherein said approach flow region has at least one heat transfer element configured to transfer heat in the exhaust gas to said outer surface.

6. The exhaust gas treatment unit according to claim 1, wherein said backflow region has at least one flow deflector configured to deflect or laminarize the exhaust gas.

7. The exhaust gas treatment unit according to claim 1, which further comprises:
   an oxidation catalytic converter disposed within a region of said approach flow region;
   said backflow region surrounding said approach flow region in said region having said oxidation catalytic converter;
   said diverting region configured to divert and pass an exhaust gas through said backflow region into said outflow region;
   said approach flow region having an upstream inflow region extending in the form of a tube through said outflow region to said outer surface; and said addition unit configured to apply a reducing agent or a reducing agent precursor to said outer surface.

8. A motor vehicle, comprising:

an internal combustion engine;

an exhaust line configured to receive exhaust gas from said internal combustion engine, said exhaust line having at least one exhaust gas treatment unit according to claim 1; and a device configured to supply a reaction agent to said at least one exhaust gas treatment unit.

9. The exhaust gas treatment unit according to claim 1, wherein said outer surface of said approach flow region has a coating with a hydrolysis function.

10. An exhaust gas treatment unit, comprising:

a housing;

said housing containing an approach flow region, a diverting region, a backflow region and an outflow region disposed in series in terms of flow, said outflow region being a region where exhaust gas exits said housing;

said approach flow region having an outer surface on which said backflow region and said outflow region are disposed; and an addition unit disposed in said outflow region and configured to add a reaction agent, said addition unit being disposed to feed the reaction agent at least partially onto said outer surface of said approach flow region, said addition unit being disposed radially to an outside of said approach flow region and aligned toward said approach flow region.

* * * * *